(12) United States Patent
Ohmura

(10) Patent No.: US 9,391,399 B2
(45) Date of Patent: Jul. 12, 2016

(54) CHARGING CONNECTOR

(71) Applicant: Yazaki Corporation, Tokyo (JP)

(72) Inventor: Takenori Ohmura, Kakegawa (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 14/771,854

(22) PCT Filed: Feb. 28, 2014

(86) PCT No.: PCT/JP2014/055074
§ 371 (c)(1),
(2) Date: Sep. 1, 2015

(87) PCT Pub. No.: WO2014/136678
PCT Pub. Date: Sep. 12, 2014

(65) Prior Publication Data
US 2016/0028185 A1   Jan. 28, 2016

(30) Foreign Application Priority Data
Mar. 5, 2013 (JP) ................................. 2013-042676

(51) Int. Cl.
H01R 13/629 (2006.01)
H01R 13/52 (2006.01)
H01R 13/627 (2006.01)
H01R 13/639 (2006.01)

(52) U.S. Cl.
CPC ...... H01R 13/62933 (2013.01); H01R 13/5227 (2013.01); H01R 13/627 (2013.01); H01R 13/6397 (2013.01); H01R 2201/26 (2013.01)

(58) Field of Classification Search
CPC .................. H01R 13/62933; H01R 13/5227; H01R 2201/26; H01R 13/627
See application file for complete search history.

(56) References Cited

U.S. PATENT DOCUMENTS

| 5,558,533 | A | 9/1996 | Hashizawa et al. |
| 5,573,417 | A | 11/1996 | Hashizawa et al. |
| 5,674,086 | A | 10/1997 | Hashizawa et al. |
| 2011/0212645 | A1 | 9/2011 | Osawa et al. |
| 2011/0281447 | A1 | 11/2011 | Kano et al. |
| 2011/0318950 | A1* | 12/2011 | Ichio ................... B60L 11/1818 439/345 |

(Continued)

FOREIGN PATENT DOCUMENTS

| JP | 05-078124 U | 10/1993 |
| JP | 10-275653 A | 10/1998 |

(Continued)

OTHER PUBLICATIONS

International Search Report for PCT/JP2014/055074 dated Jun. 3, 2014.

Primary Examiner — Briggitte R Hammond
(74) Attorney, Agent, or Firm — Sughrue Mion, PLLC

(57) ABSTRACT

A charging connector (1) includes a connector case (3A, 3B) and a release lever (40) slidable in the connector case (3A, 3B). The release lever (40) includes slide projections (48). The connector case (3A, 3B) includes slide grooves (6) in which the slide projections (48) are inserted. The slide projections (48) slide in the slide grooves (6) so that the release lever (40) is guided by the slide grooves (6) in a slidable manner. The slide grooves (6) include water drain grooves (8) provided on bottoms thereof and extending downward to penetrate the bottoms.

3 Claims, 15 Drawing Sheets

(56) References Cited

U.S. PATENT DOCUMENTS

| | | | |
|---|---|---|---|
| 2012/0064755 A1* | 3/2012 | Ichio | H01R 13/5227 439/358 |
| 2012/0088384 A1 | 4/2012 | Hori et al. | |
| 2012/0202365 A1* | 8/2012 | Ichio | B60L 11/1818 439/131 |
| 2013/0078846 A1* | 3/2013 | Sasaki | B60L 11/1818 439/374 |
| 2014/0153198 A1* | 6/2014 | Yamasaki | H02K 5/10 361/747 |

FOREIGN PATENT DOCUMENTS

| | | |
|---|---|---|
| JP | 2011-181334 A | 9/2011 |
| JP | 2011-238535 A | 11/2011 |
| JP | 2011-238633 A | 11/2011 |

* cited by examiner

FIG. 6
(a)
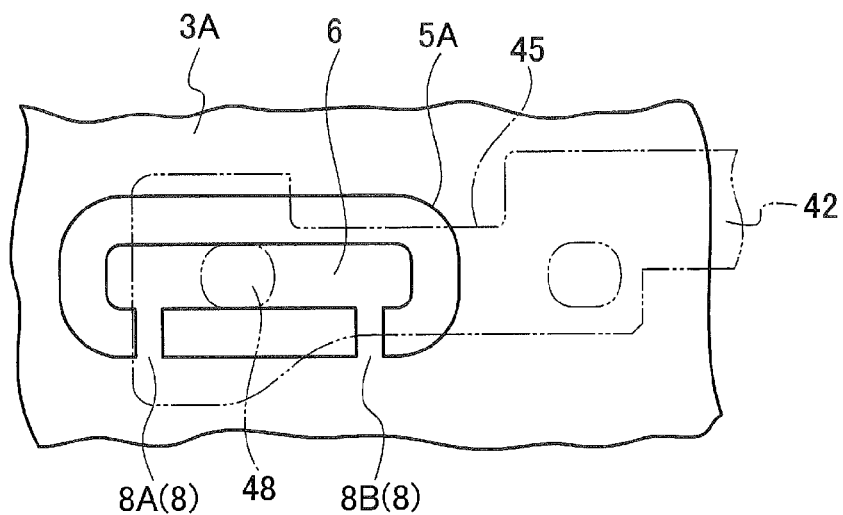
(b)
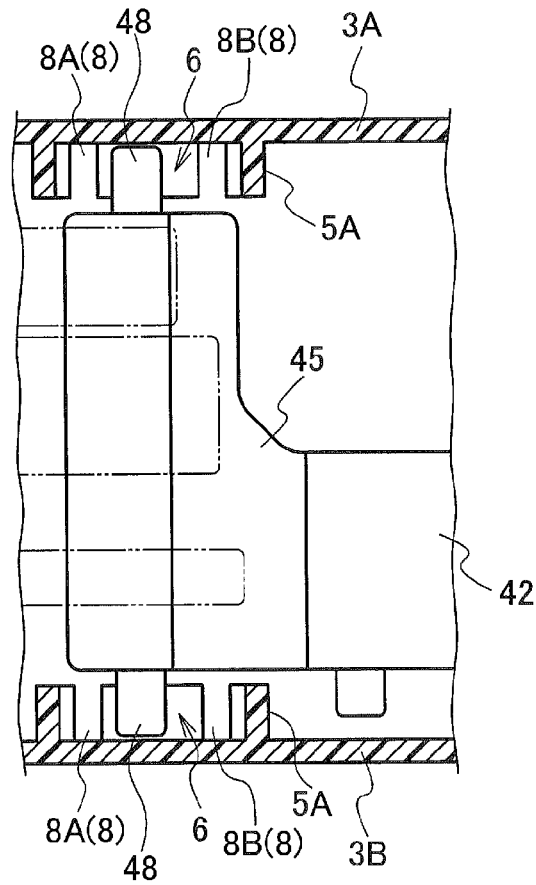

CHARGING CONNECTOR

CROSS REFERENCE TO RELATED APPLICATIONS

This application is a National Stage of International Application No. PCT/JP2014/055074 filed Feb. 28, 2014, claiming priority based on Japanese Patent Application No. 2013-042676, filed Mar. 5, 2013, the contents of all of which are incorporated herein by reference in their entirety.

TECHNICAL FIELD

The present invention relates to a charging connector, and more particularly to a charging connector fitted into a vehicle-side inlet provided on a vehicle.

BACKGROUND ART

An electrically powered vehicle (such as an electric vehicle (EV) and a hybrid electric vehicle (HEV)) driven in such a manner as to drive a motor by electric power supplied from a storage battery mounted on the vehicle have become widespread with increasing environmental awareness and concerns. In order to deal with infrastructure enhancement for such an electrically powered vehicle, expansion of a charging device is being carried out. A conventional charging connector provided on a charging device is explained below with reference to FIGS. 13 and 14.

As illustrated in FIG. 13, a conventional charging connector 100 includes a connector fit portion 101 fitted into a mating vehicle-side inlet (not illustrated), a connector case 110 housing the connector fit portion 101, a rotation lever 120 that slides the connector fit portion 101 in a fitting direction toward the vehicle-side inlet, and a release lever 130 that locks the rotation lever 120 in a state where the connector fit portion 101 slides in the fitting direction and releases the locked state of the rotation lever 120.

The connector case 110 includes a connector housing portion 111 housing the connector fit portion 101, a handle 112 held by an operator, and a lever attachment portion 113 to which the rotation lever 120 is attached, the lever attachment portion 113 being provided between the connector housing portion 111 and the handle 112.

The connector fit portion 101 housed in the connector housing portion 111 is provided therein with power supply terminals 103 connected to power receiving terminals (not illustrated) provided in the vehicle-side inlet. The connector fit portion 101 is biased by a coil spring 104 toward the lever attachment portion 113 in the connector housing portion 111.

As illustrated in FIG. 14, the lever attachment portion 113 is provided inside thereof with slide grooves 122 supporting a shaft 121 of the rotation lever 120 in a slidable manner in a fit-removal direction. As illustrated in FIG. 13, the shaft 121 of the rotation lever 120 are provided in a slidable manner in the fit removal direction together with a slider portion 107 covering a wire 105 extending outward from a power supply terminal (not illustrated) inside the connector fit portion 101.

The conventional charging connector 100 is fitted into the vehicle-side inlet in such a manner as to insert the connector fit portion 101 into the vehicle-side inlet and then pull the rotation lever 120 while holding the handle 112 (rotating operation), whereby the connector fit portion 101 (the power supply terminals 103) and the slider portion 107 (the wire 105) slide so that the connector fit portion 101 is completely fitted into the vehicle-side inlet.

When the charging connector 100 is removed from the vehicle-side inlet, the release lever 130 is pushed down so that the connector fit portion 101 is removed from the vehicle-side inlet due to biasing force of the coil spring 104.

CITATION LIST

Patent Literature

PTL 1: JP H10-275653 A

SUMMARY

In the conventional charging connector 100, however, if water such as rainwater or water condensation enters the connector case 110, the water passes along the inner surface of the connector case 110 and may further enter and remain inside the slide grooves 122 in which the shaft 121 of the rotation lever 120 is supported.

More particularly, the water remaining in the slide grooves 122 may be frozen in winter, which prevents the shaft 121 of the rotation lever 120 from sliding in the slide grooves 122. As a result, the charging connector 100 may not be fitted into or removed from the vehicle-side inlet.

The present invention has been made in order to solve the conventional problem. An object of the present invention is to provide a charging connector capable of being fitted into and removed from a vehicle-side inlet even if water enters slide grooves and preventing the water from being frozen in the slide grooves.

In order to solve the problem described above, a charging connector according to a first aspect of the present invention includes: a connector case; a release lever provided in a slidable manner in the connector case; a slide projection provided in one of the connector case and the release lever; a slide groove provided in another one of the connector case and the release lever, in which the slide projection is inserted, the slide projection sliding in the slide groove so that the release lever is guided by the slide groove in a slidable manner; and a water drain groove provided on a bottom of the slide groove and extending downward to penetrate the bottom of the slide groove.

The water drain groove preferably includes a front groove located in the slide groove toward a vehicle-side inlet in a fitting direction and a rear groove located in the slide groove opposite to the vehicle-side inlet in a removal direction.

The slide groove is preferably surrounded by a projecting wall projecting on an inner surface of the connector case, and the water drain groove preferably divides a lower wall surface of the projecting wall.

In the charging connector according to the first aspect of the present invention, since the water drain groove penetrates the bottom of the slide groove in which the slide projection is inserted, water such as rainwater or water condensation passing along the inner surface of the connector case and further entering the slide groove can be drained from the water drain groove so as to prevent the water from remaining in the slide groove. Accordingly, the charging connector can be fitted into and removed from the vehicle-side inlet even if the water enters the slide groove since the water can be prevented from being frozen inside the slide groove.

BRIEF DESCRIPTION OF DRAWINGS

FIG. 6(a) is a vertical cross-sectional view illustrating part of the case body and the release lever according to the embodiment, and FIG. 6(b) is a lateral cross-sectional view illustrating part of the case body and the release lever according to the embodiment.

DESCRIPTION OF EMBODIMENTS

Figure 1:
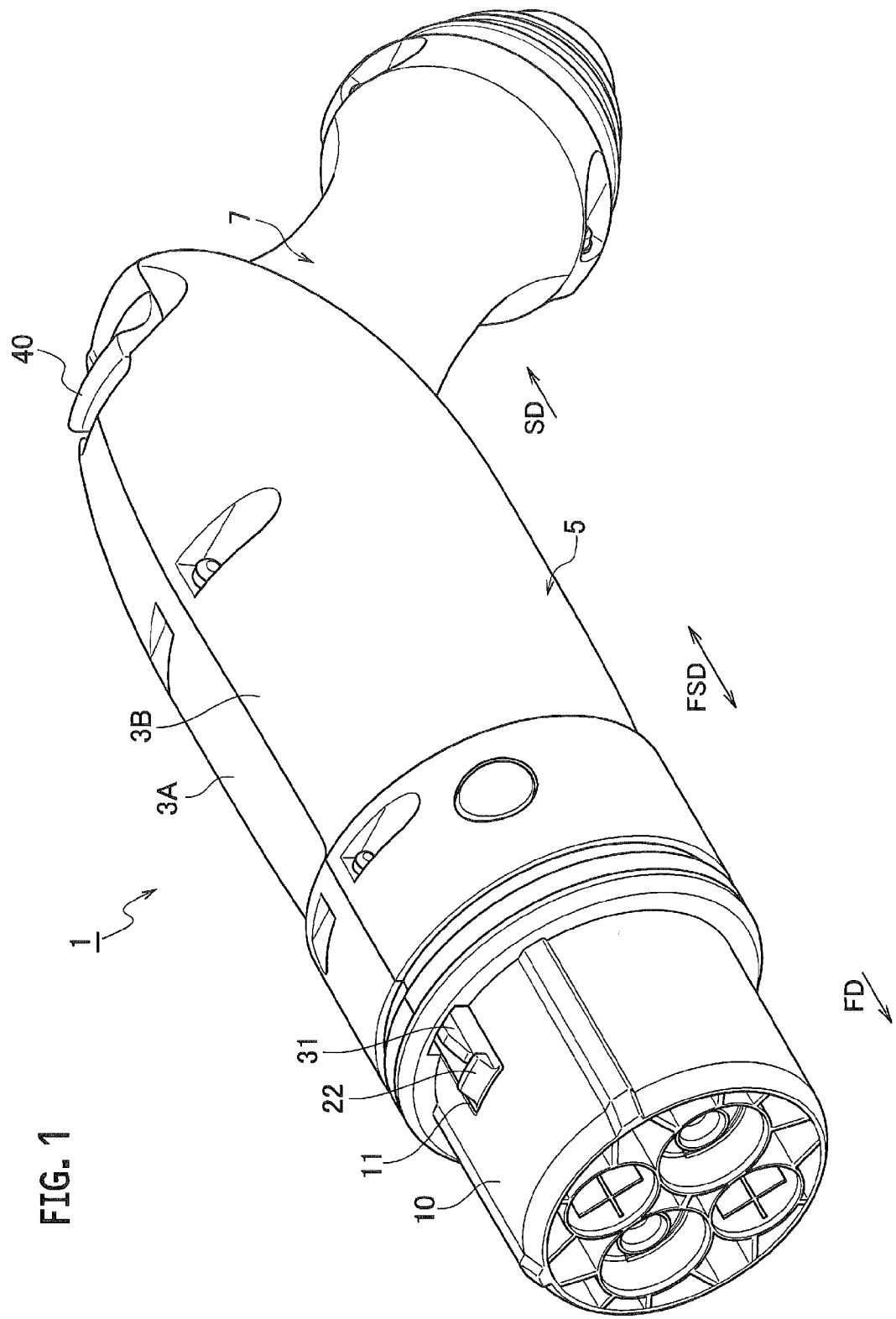
FIG. 1 is an entire perspective view illustrating a charging connector according to an embodiment.

A charging connector 1 according to an embodiment will be explained below with reference to the drawings. Here, the same or similar elements in the following explanations of the drawings are indicated by the same or similar reference numerals. It should be noted that the respective elements are schematically illustrated in the drawings, and dimensional ratios in the drawings are different from actual ratios. The specific dimensions thus should be taken into consideration in accordance with the following explanations. In addition, the respective drawings may include the elements which are equivalent but differ in dimensional ratio.

The configuration of the charging connector 1 according to the embodiment is explained with reference to FIGS. 1 to 6.

Here, for ease of explanation, one side of the charging connector 1 toward a mating vehicle-side inlet 90 (the left in FIGS. 1 to 3 and the right in FIG. 4) is defined as a "tip side", and the direction toward the tip side is defined as "fitting direction FD". In addition, the other side of the charging connector 1 opposite to the vehicle-side inlet 90 (the right in FIGS. 1 to 3 and the left in FIG. 4) is defined as a "rear side", and the direction toward the rear side is defined as "removal direction SD".

As illustrated in FIGS. 1 to 4, the charging connector 1 is fitted into the vehicle-side inlet 90 provided with power receiving-side terminals (not illustrated) so that a storage battery mounted on a vehicle is charged. The charging connector 1 is attached to a tip of a wire W (not illustrated) extending from a power supply device (not illustrated).

The charging connector 1 includes connector cases 3A, 3B as a pair of split bodies formed substantially into a mirror-image symmetrical shape and connected in a manner such that the respective edge surfaces face each other. The connector cases 3A, 3B include a case body 5 and a handle 7 obliquely extending from the rear of the case body 5 so as to be held by an operator.

The case body 5 is provided, on the front side thereof, with a connector fit portion 10 fitted into the vehicle-side inlet 90. A notch 11 is formed on the outer circumferential surface of the connector fit portion 10. The connector fit portion 10 houses power supply-side terminals (not illustrated) connected to the power receiving-side terminals (not illustrated) inside the vehicle-side inlet 90. Note that the arrangement and other specifications of the power supply-side terminals (not illustrated) conform to standards of their respective categories, and explanations thereof are omitted here.

The wire W extending from the connector fit portion 10 is arranged in the case body 5 on the lower side thereof. The wire W passes through the handle 7 and is exposed to the outside. The case body 5 includes, on the upper side thereof, a lock arm 20, a fit detection arm 30, a release lever 40, and a lever holding arm 50.

Figure 5:
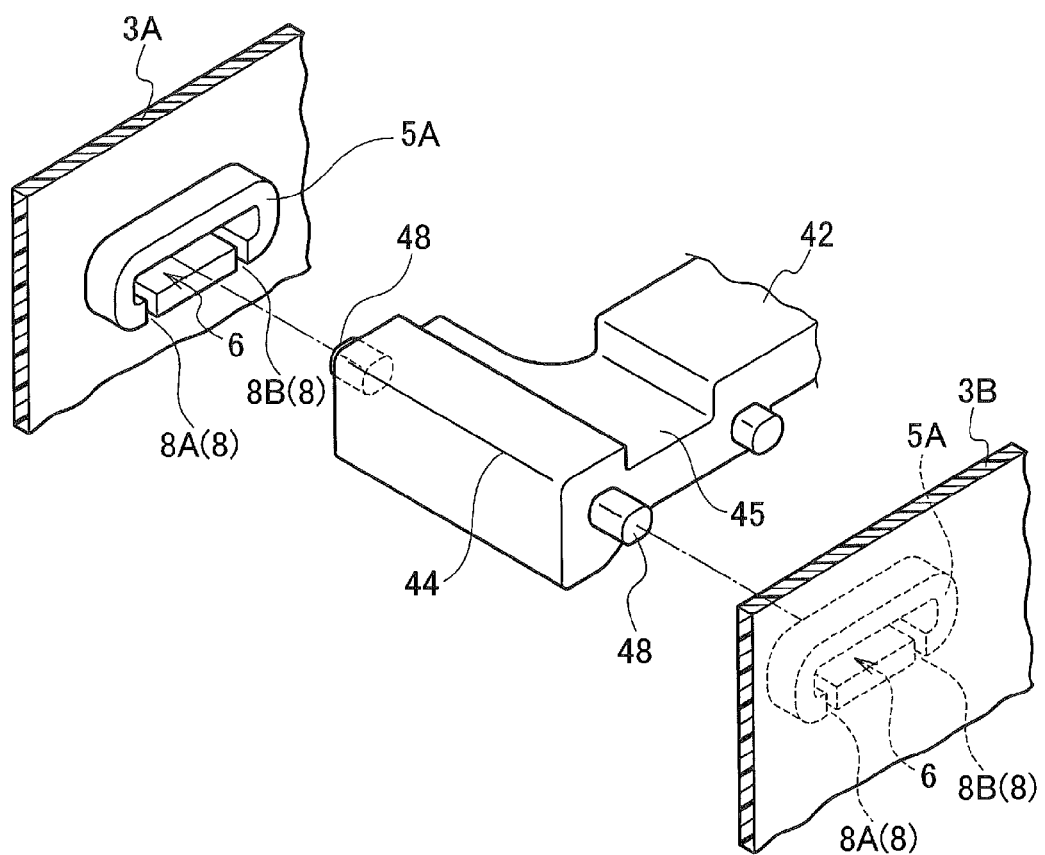
FIG. 5 is a perspective view illustrating part of a case body and a release lever according to the embodiment.
Figure 15:
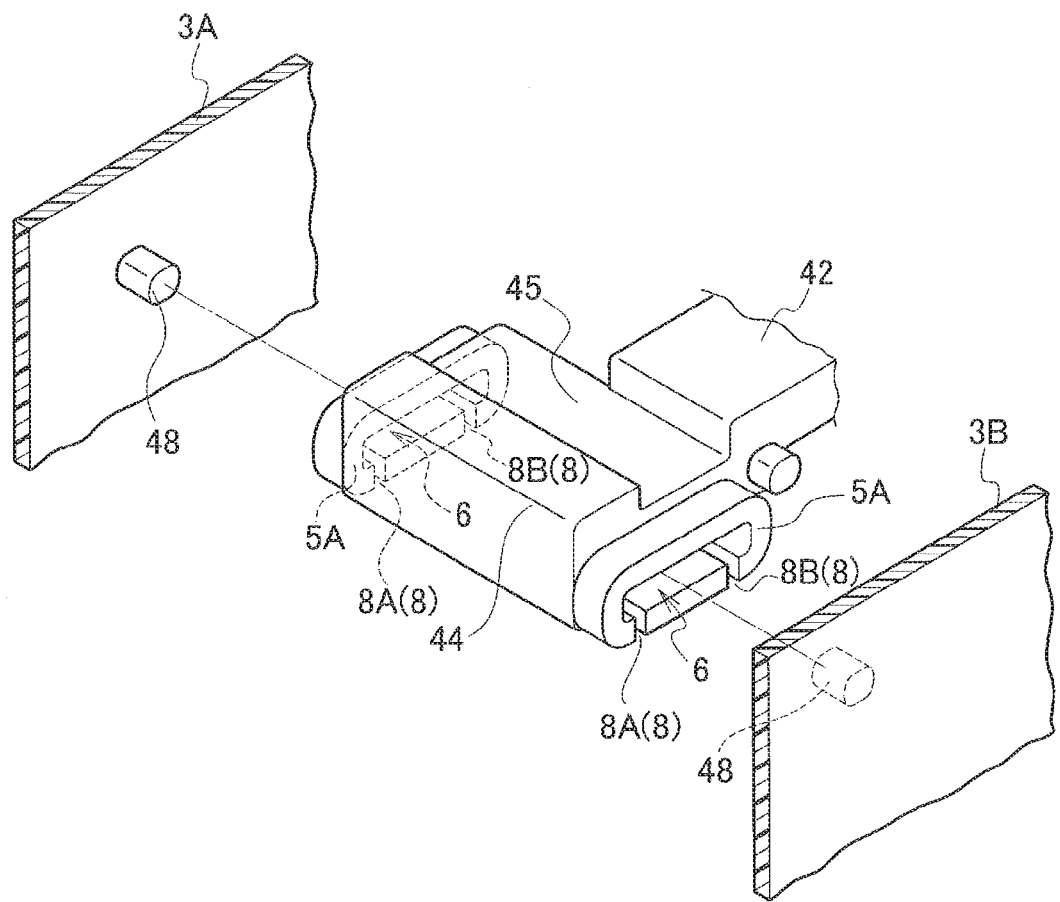
FIG. 15 is a perspective view illustrating part of a case body and a release lever according to an embodiment.

As illustrated in FIGS. 5 and 6, the case body 5 is provided, on the inner surface on the upper side thereof, with laterally-elongated slide grooves 6 into which slide projections 48 of the release lever 40 are inserted, the slide grooves 6 guiding the slide projections 48 in a slide direction of the release lever 40 (namely, fit-removal direction FSD in which the charging connector 1 is fitted into and separated from the vehicle-side inlet 90). Alternatively, as illustrated in FIG. 15, in some embodiments, the slide grooves 6 may be provided on the release lever 40.

Each of the slide grooves 6 is surrounded by a projecting wall 5A projecting on the inner surface of the case body 5. Each of the slide grooves 6 is provided, on the bottom thereof, with water drain grooves 8 each extending downward and penetrating the bottom. In other words, the water drain grooves 8 divide a lower wall surface of the projecting wall 5A. Although the bottom of each of the slide grooves 6 is explained as the lower wall surface of the projecting wall 5A in the description, the bottom is only required to be a portion located on the lower side of each of the slide grooves 6 when provided on the power supply device (not illustrated) side.

The water drain grooves 8 includes a front groove 8A located in each of the slide grooves 6 toward the vehicle-side inlet 90 in the fitting direction FD and a rear groove 8B located in each of the slide grooves 6 opposite to the vehicle-side inlet 90 in the removal direction SD.

Figure 2:
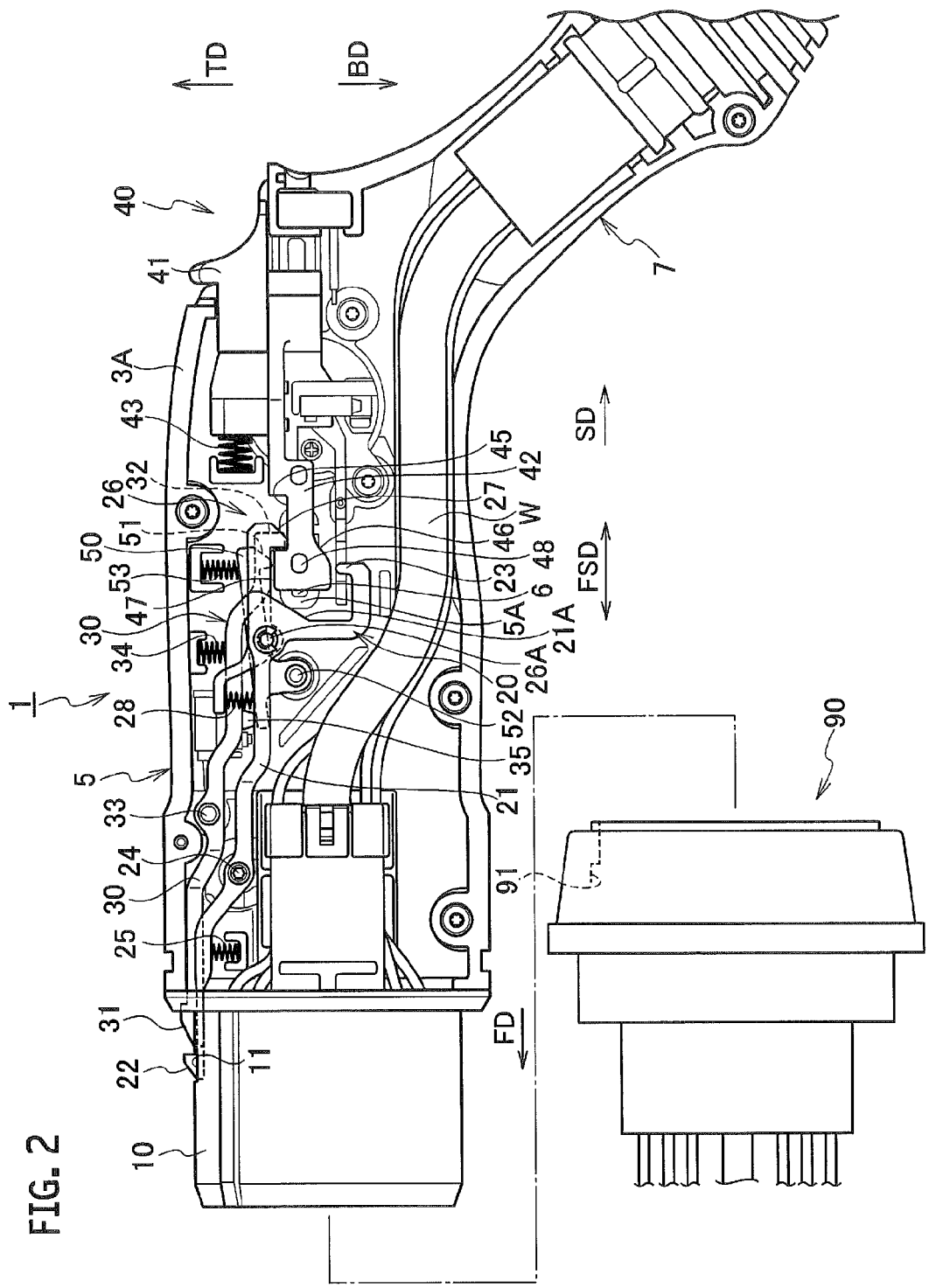
FIG. 2 is a vertical cross-sectional view illustrating the charging connector according to the embodiment.
Figure 3:
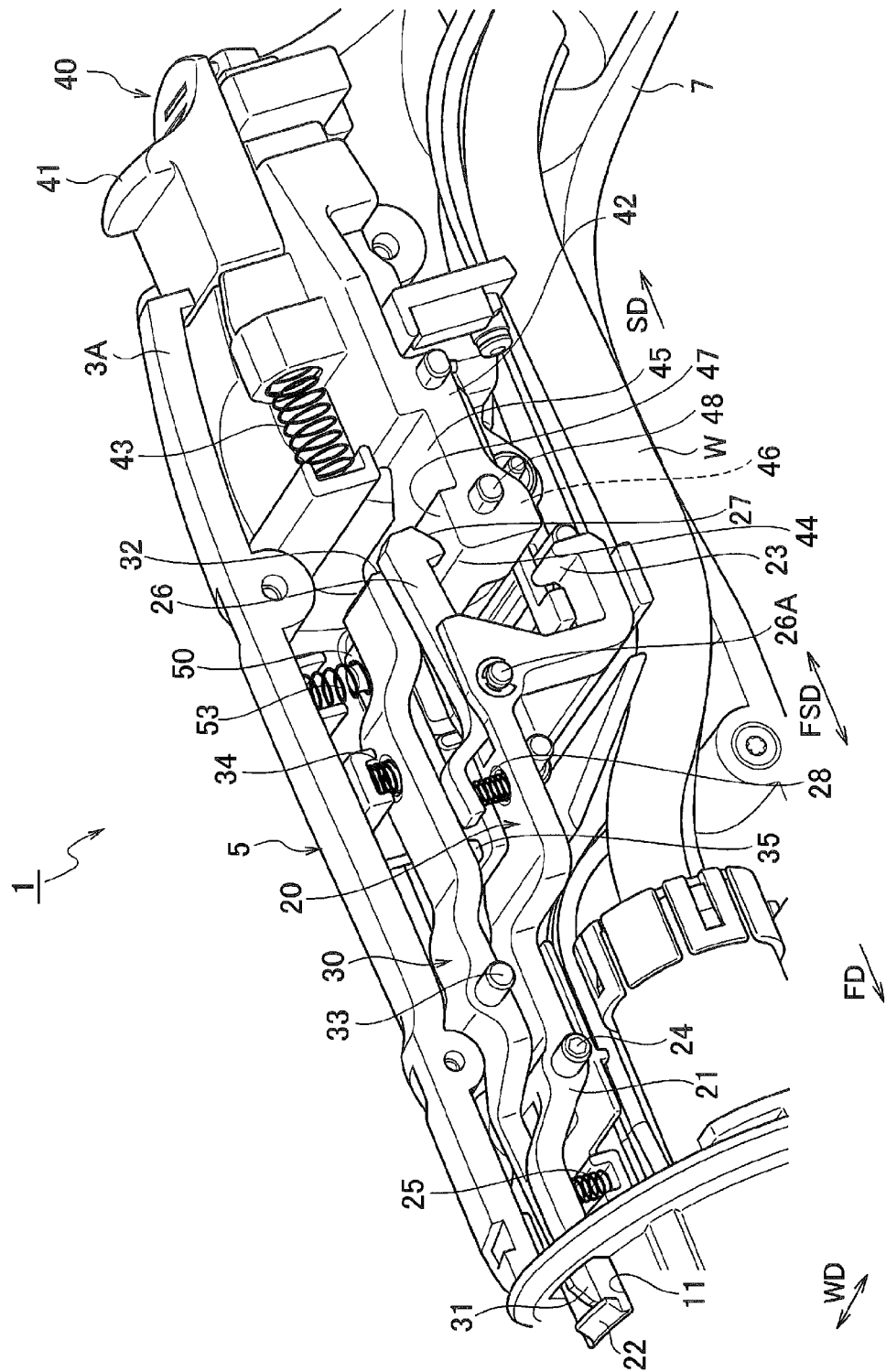
FIG. 3 is a perspective view illustrating the inside of the charging connector according to the embodiment.
Figure 4:
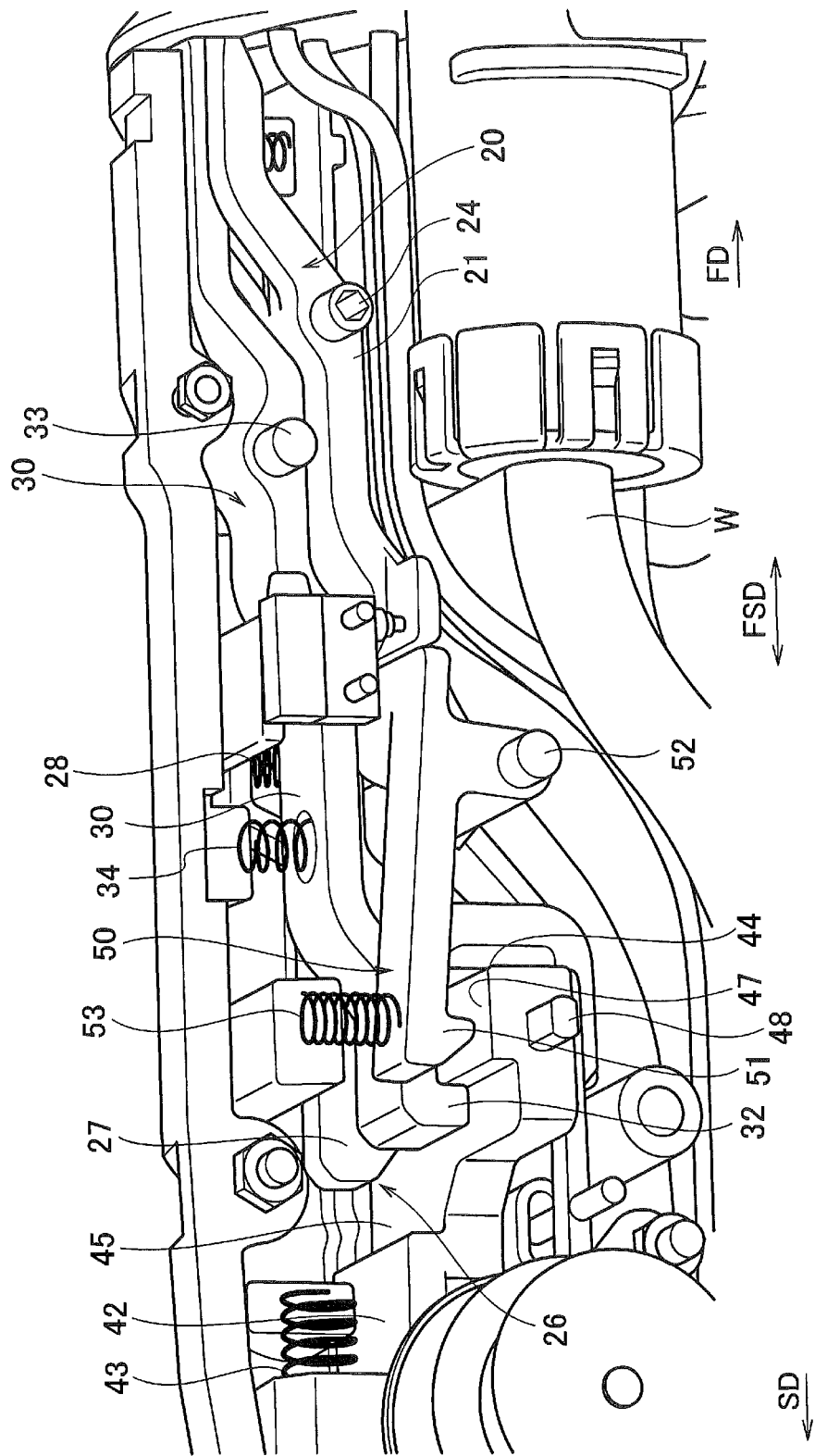
FIG. 4 is a perspective view illustrating the inside of the charging connector according to the embodiment.

The lock arm 20 prevents the charging connector 1 from being removed from the vehicle-side inlet 90 in the state where the vehicle-side inlet 90 and the charging connector 1 are fitted together. As illustrated in FIGS. 2 to 4, the lock arm 20 includes a main arm 21 provided in a swingable manner about a first shaft 24 inside the case body 5, and a lock support arm 26 that swings together with the main arm 21.

As illustrated in FIGS. 1 to 3, the main arm 21 includes a lock claw 22 located at the tip of the main arm 21 and capable of projecting from the notch 11 of the connector fit portion 10, and a lock engagement piece 23 located at the rear end of the main arm 21 and serving as an engaging portion which is locked with a lower engagement groove 46 of the release lever 40.

The main arm 21 is swingable about the first shaft 24 between a locked position where the lock claw 22 is locked with a lock groove 91 provided on the inner circumferential surface of the vehicle-side inlet 90 and an unlocked position where the locked state between the lock claw 22 and the lock groove 91 is released. The main arm 21 is biased by a first coil spring 25 in a direction in which the lock claw 22 projects from the notch 11 of the connector fit portion 10 (upper direction TD).

The main arm 21 is bent in the lower direction BD at the first shaft 24. The main arm 21 further extends in the removal direction SD from the lower end of the bent portion and is provided with the lock engagement piece 23 at the tip thereof.

The lock engagement piece 23 engages with the lower engagement groove 46 of the release lever 40 in the unlocked position of the main arm 21 (namely, in the state where the lock claw 22 retreats into the notch 11). The lock engagement piece 23 is released from the engagement with an upper lock groove 45 of the release lever 40 in the locked position of the main arm 21 (namely, in the state where the lock claw 22 projects from the notch 11).

As illustrated in FIGS. 2 and 3, the lock support arm 26 includes an auxiliary lock piece 27 located at the rear end of the lock support arm 26 and locked with the upper lock groove 45 of the release lever 40.

The lock support arm 26 is swingable about a second shaft 26A between a locked position where the auxiliary lock piece 27 is locked with the upper lock groove 45 of the release lever 40 and an unlocked position (a release position) where the locked state between the auxiliary lock piece 27 and the upper lock groove 45 is released. The lock support arm 26 is biased by a second coil spring 28 in the locked direction of the auxiliary lock piece 27 (lower direction BD).

The auxiliary lock piece 27 extends in the lower direction BD and is configured to be locked with the upper lock groove 45. The auxiliary lock piece 27 is located to be opposed to the lock engagement piece 23. The auxiliary lock piece 27 is located ahead of a detection lock piece 32 of the fit detection arm 30 and a hold lock piece 51 of the lever holding arm 50 in the removal direction SD.

The auxiliary lock piece 27 is released from the engagement with the upper lock groove 45 of the release lever 40 in the unlocked position of the main arm 21 (namely, in the state where the lock claw 22 retreats into the notch 11). The auxiliary lock piece 27 is locked with the upper lock groove 45 of the release lever 40 in the locked position of the main arm 21 (namely, in the state where the lock claw 22 projects from the notch 11).

The fit detection arm 30 detects a complete-fit state between the vehicle-side inlet 90 and the connector fit portion 10. As illustrated in FIGS. 2 to 4, the fit detection arm 30 includes a detection claw 31 provided on the tip side of the fit detection arm 30 and capable of projecting from the notch 11 of the connector fit portion 10, and the detection lock piece 32 provided on the rear side of the fit detection arm 30 and locked with the upper lock groove 45 of the release lever 40.

The fit detection arm 30 is swingable about a third shaft 33 between a fitted position where the fitted state of the connector fit portion 10 into the vehicle-side inlet 90 is detected when the detection claw 31 comes into contact with the tip surface of the vehicle-side inlet 90 and a removed position where the removal of the connector fit portion 10 from the vehicle-side inlet 90 is detected when the contact between the detection claw 31 and the vehicle-side inlet 90 is released. The fit detection arm 30 is biased by a third coil spring 34 in a direction in which the detection claw 31 projects from the notch 11 of the connector fit portion 10 (namely, in the locked direction of the detection lock piece 32).

The detection claw 31 is projectable to the outside (capable of advancing and retreating) through the notch 11 of the connector fit portion 10. The detection claw 31 is located behind the lock claw 22 of the main arm 21 in the removal direction SD.

The detection lock piece 32 extends in the lower direction BD and is configured to be locked with the upper lock groove 45 of the release lever 40. The detection lock piece 32 is located behind the auxiliary lock piece 27 of the lock support arm 26 in the fitting direction FD and is located ahead of the hold lock piece 51 of the lever holding arm 50 in the removal direction SD.

The detection lock piece 32 is released from the locked state with the upper lock groove 45 of the release lever 40 in the fitted position of the connector fit portion 10 (namely, in the state where the detection claw 31 retreats into the notch 11 of the connector fit portion 10). The detection lock piece 32 is locked with the upper lock groove 45 of the release lever 40 in the removed position of the connector fit portion 10 (namely, in the state where the detection claw 31 projects from the notch 11 of the connector fit portion 10).

A press projection 35 projecting in the lower direction BD is provided between the detection lock piece 32 and the third shaft 33. The press projection 35 presses the lever holding arm 50 on the tip side (closer to the tip than a fourth shaft 52) in the lower direction BD so as to release the locked state between the upper lock groove 45 of the release lever 40 and the hold lock piece 51 of the lever holding arm 50.

The release lever 40 releases the locked state between the lock groove 91 of the vehicle-side inlet 90 and the lock claw 22. The release lever 40 is slidable between a start position of a pushing operation with respect to the case body 5 and an end position of the pushing operation (namely, in the fit-removal direction FSD).

As illustrated in FIGS. 2 and 3, the release lever 40 includes a release switch 41 having a rear end projecting from the case body 5 and moved in the fit-removal direction FSD, and a release body 42 located in the case body 5 and integrated with the release switch 41.

The release switch 41 is biased by a fourth coil spring 43 to the start position of the pushing operation (namely, in the fit-removal direction FSD). The release body 42 includes a tip contact portion 44 that comes into contact with and pushes up the auxiliary lock piece 27 of the lock support arm 26, the detection lock piece 32 of the fit detection arm 30, and the hold lock piece 51 of the lever holding arm 50 at the time of the pushing operation of the release switch 41.

The tip contact portion 44 comes into contact with an inclined surface 21A of the main arm 21 in the end position of the pushing operation of the release switch 41 so as to swing the main arm 21 to the unlocked position. The tip contact portion 44 is formed into a curve.

The tip on the upper side of the release body 42 is provided with the upper lock groove 45 with which the auxiliary lock piece 27 of the lock support arm 26 and the detection lock piece 32 of the fit detection arm 30 are locked. The tip on the lower side of the release body 42 is provided with the lower engagement groove 46 serving as an engaged portion with which the lock engagement piece 23 of the main arm 21 engages.

The release body 42 is provided, on side walls, with slide projections 48 projecting toward the slide grooves 6. As illustrated in FIGS. 5 and 6, the slide projections 48 are inserted into the slide grooves 6 and slide therein in the slide direction of the release lever 40. Alternatively, as illustrated in FIG. 15, in some embodiments, the slide projections 48 may be provided on the inner surface of the case body 5.

The lever holding arm 50 holds the release lever 40 in the end position of the release lever 40. As illustrated in FIGS. 2 to 4, the lever holding arm 50 includes the hold lock piece 51 provided at the rear end of the lever holding arm 50 and locked with the upper lock groove 45 of the release lever 40 in the pressed position of the release lever 40.

The lever holding arm 50 is swingable about the fourth shaft 52 between a lever hold position where the release lever 40 is held in the end position (namely, the state where the hold lock piece 51 is locked with the upper lock groove 45) and a lever non-hold position where the release lever 40 is not held (namely, the state where the locked state between the hold lock piece 51 and the upper lock groove 45 is released).

The lever holding arm 50 is provided with a fifth coil spring 53 at a position closer to the hold lock piece 51 than the third shaft 33. The lever holding arm 50 on the hold lock piece 51 side is biased by the fifth coil spring 53 in the lower direction BD. The lever holding arm 50 comes into contact, at the position closer to the tip side than the third shaft 33, with the press projection 35 of the fit detection arm 30.

The hold lock piece 51 extends in the lower direction BD and is configured to be locked with the upper lock groove 45. The hold lock piece 51 is located behind the auxiliary lock piece 27 of the lock support arm 26 and the detection lock piece 32 of the fit detection arm 30 in the fitting direction FD.

The hold lock piece 51 is locked with the upper lock groove 45 of the release lever 40 in the lever hold position. The hold lock piece 51 is pressed at the position closer to the tip side than the third shaft 33 of the lever holding arm 50 by the press projection 35 in the lever non-hold position so that the locked state between the upper lock groove 45 of the release lever 40 and the hold lock piece 51 is released.

Next, the operation of the charging connector 1 is explained below with reference to FIGS. 7 to 12.

Figure 7:
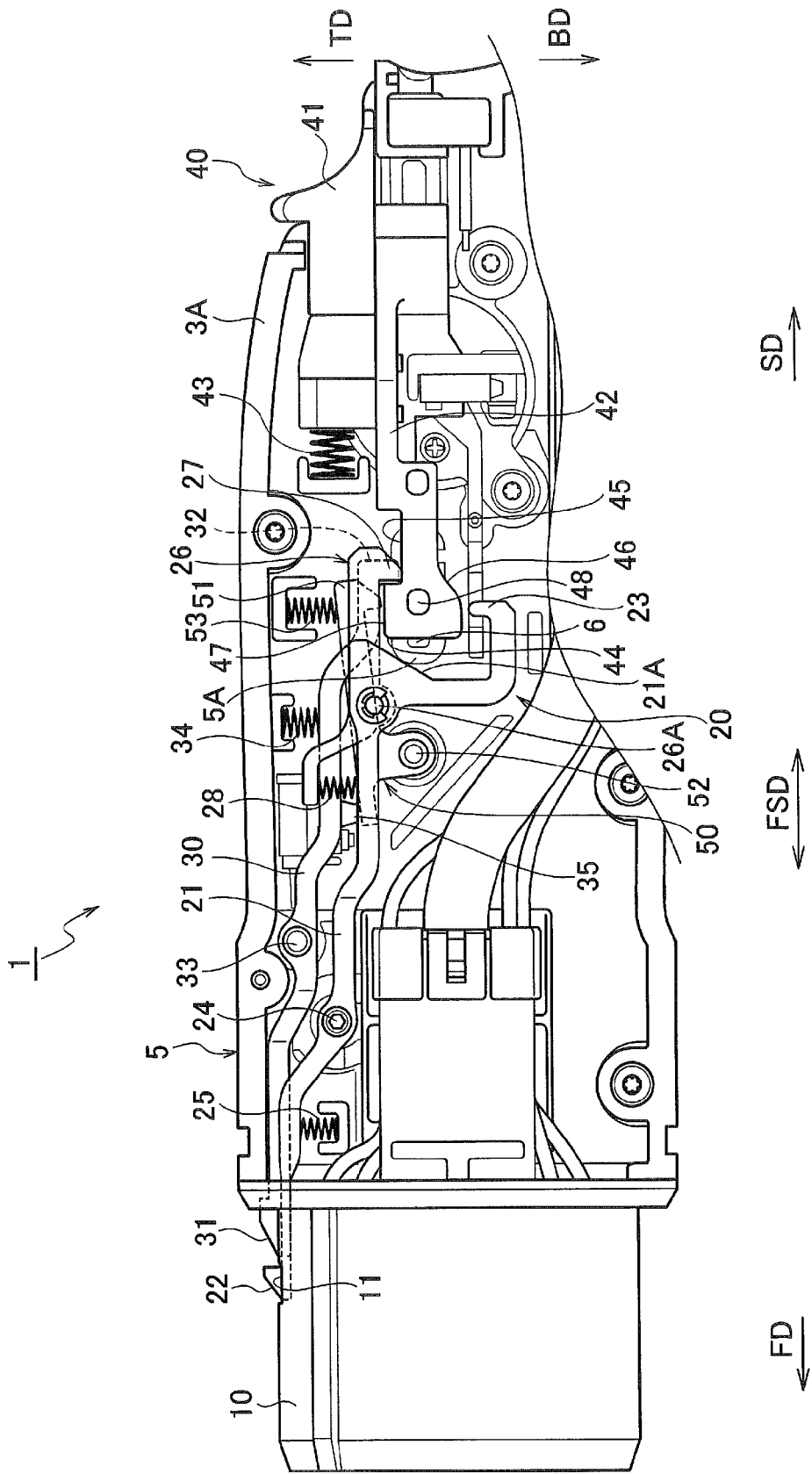
FIG. 7 is a view for explaining an operation (before insertion operation) of the charging connector according to the embodiment.

As illustrated in FIG. 7, in the state where the charging connector 1 is removed from the vehicle-side inlet 90, the lock claw 22 of the main arm 21 and the detection claw 31 of the fit detection arm 30 both project from the notch 11 of the connector fit portion 10.

In this state, the detection lock piece 32 of the fit detection arm 30 is locked with the upper lock groove 45 of the release lever 40. Here, the auxiliary lock piece 27 is located ahead of the detection lock piece 32 in the removal direction SD and is therefore in a state capable of being immediately locked with the upper lock groove 45 when the detection lock piece 32 and the upper lock groove 45 are separated from each other while the auxiliary lock piece 27 is not completely locked with the upper lock groove 45.

Figure 8:
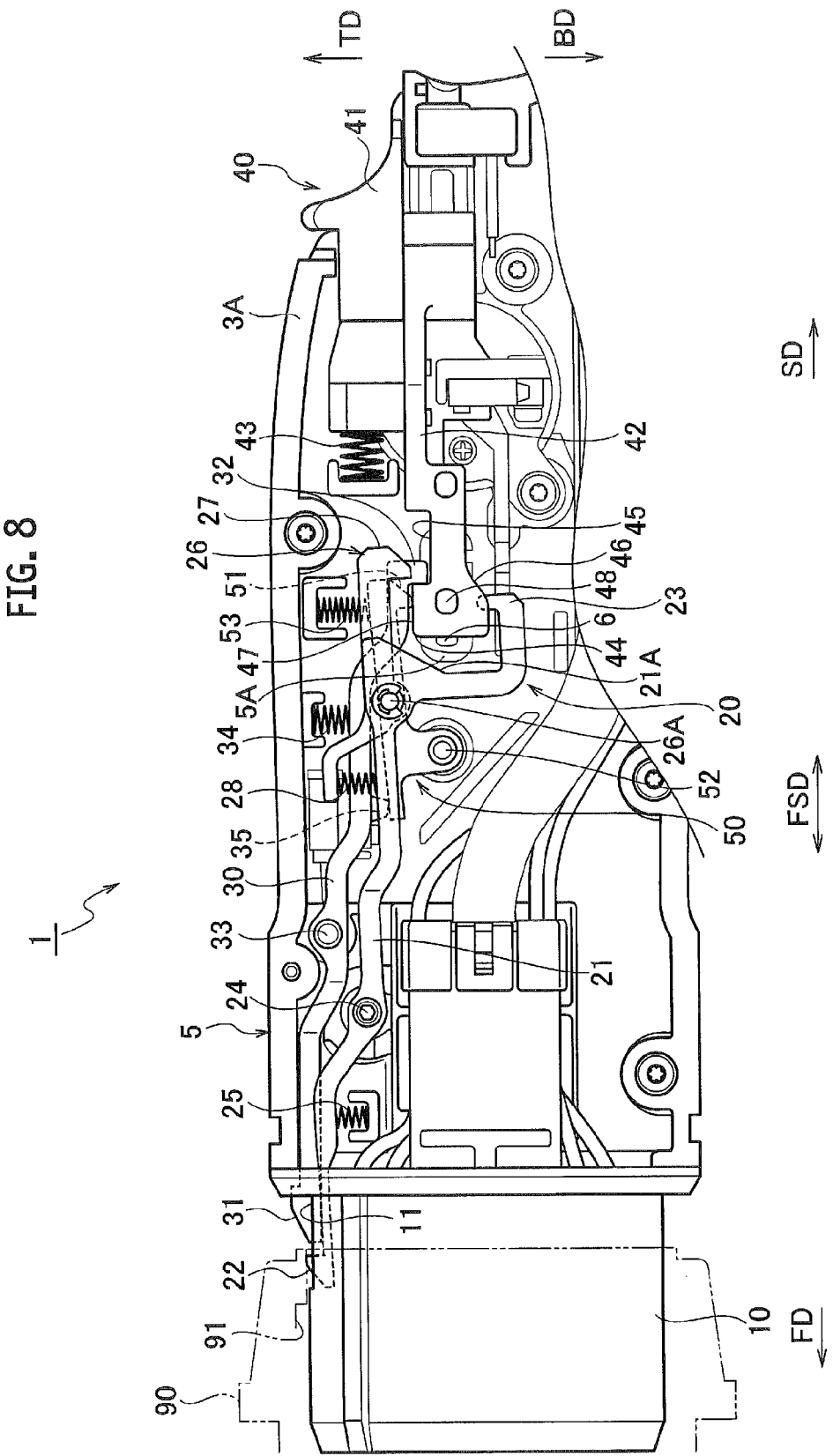
FIG. 8 is a view for explaining the operation (during insertion operation) of the charging connector according to the embodiment.

As illustrated in FIG. 8, when the charging connector 1 is gradually fitted into the vehicle-side inlet 90, the lock claw 22 comes into contact with the inner circumferential surface of the vehicle-side inlet 90 so as to be pushed into the notch 11 of the connector fit portion 10. The main arm 21 then swings so that the auxiliary lock piece 27 is separated from the upper lock groove 45. Here, the lock engagement piece 23 of the main arm 21 is inserted into the lower engagement groove 46.

Figure 9:
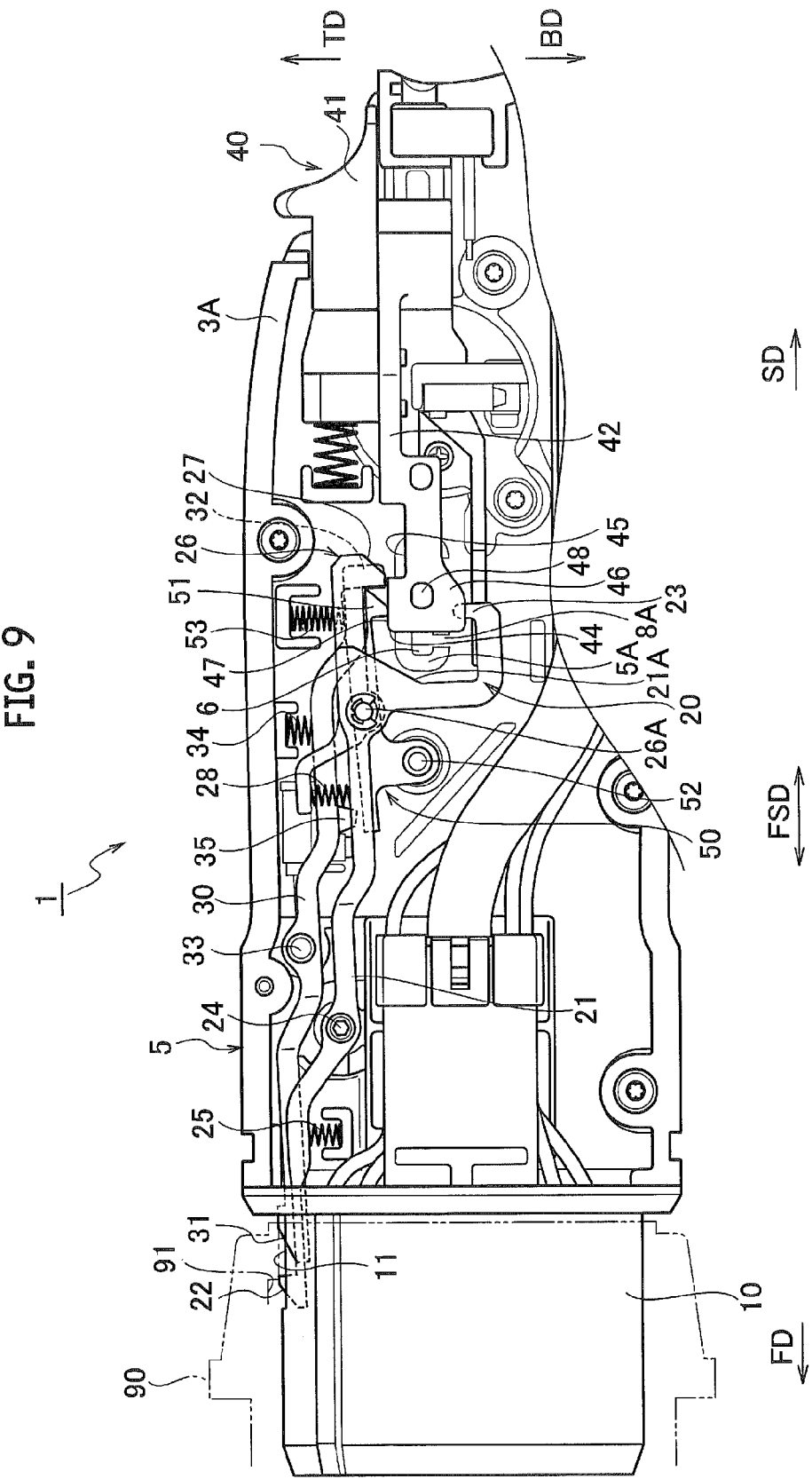
FIG. 9 is a view for explaining the operation (during insertion operation) of the charging connector according to the embodiment.

As illustrated in FIG. 9, when the charging connector 1 is further fitted into the vehicle-side inlet 90, the detection claw 31 comes into contact with the tip surface of the vehicle-side inlet 90 so as to be pushed into the notch 11 of the connector fit portion 10. The fit detection arm 30 then swings so that the detection lock piece 32 is separated from the upper lock groove 45. The lock engagement piece 23 inserted in the lower engagement groove 46 of the release body 42 is still prevented from moving in the removal direction SD of the release lever 40 (toward the start position of the pushing operation).

Figure 10:
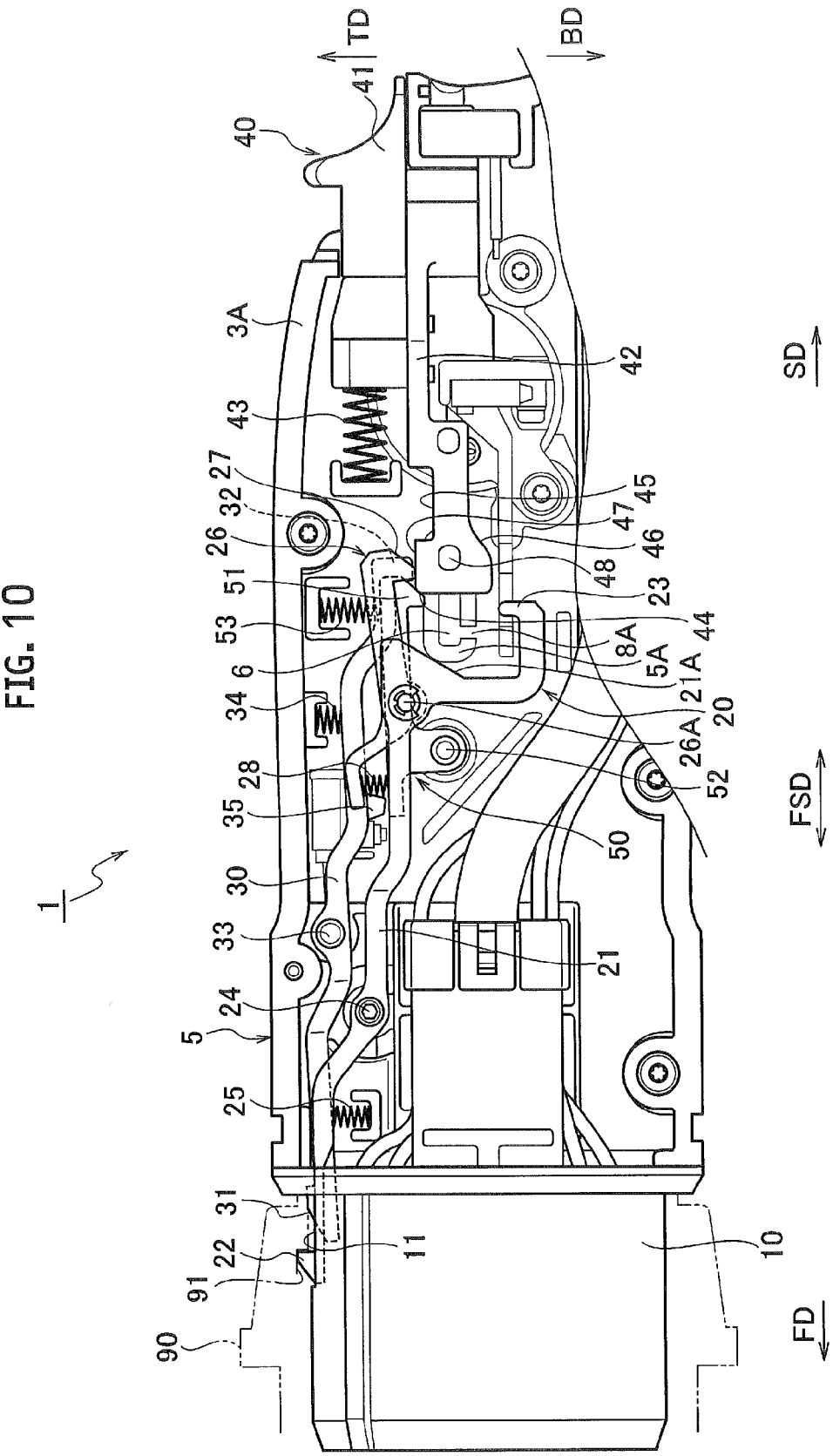
FIG. 10 is a view for explaining the operation (complete-fit state) of the charging connector according to the embodiment.

As illustrated in FIG. 10, when the charging connector 1 is completely fitted into the vehicle-side inlet 90, the main arm 21 swings and the lock claw 22 projects from the notch 11 of the connector fit portion 10 so that the main arm 21 is located in the locked position. The lock claw 22 is then locked with the lock groove 91 of the vehicle-side inlet 90.

Since the lock engagement piece 23 is separated from the lower engagement groove 46, the release lever 40 moves in the removal direction SD (toward the start position of the pushing operation). Namely, the slide projections 48 of the release lever 40 slide in the removal direction SD (in particular, from the front groove 8A side to the rear groove 8B side) in the slide grooves 6 on the inner surface of the case body 5.

Figure 11:
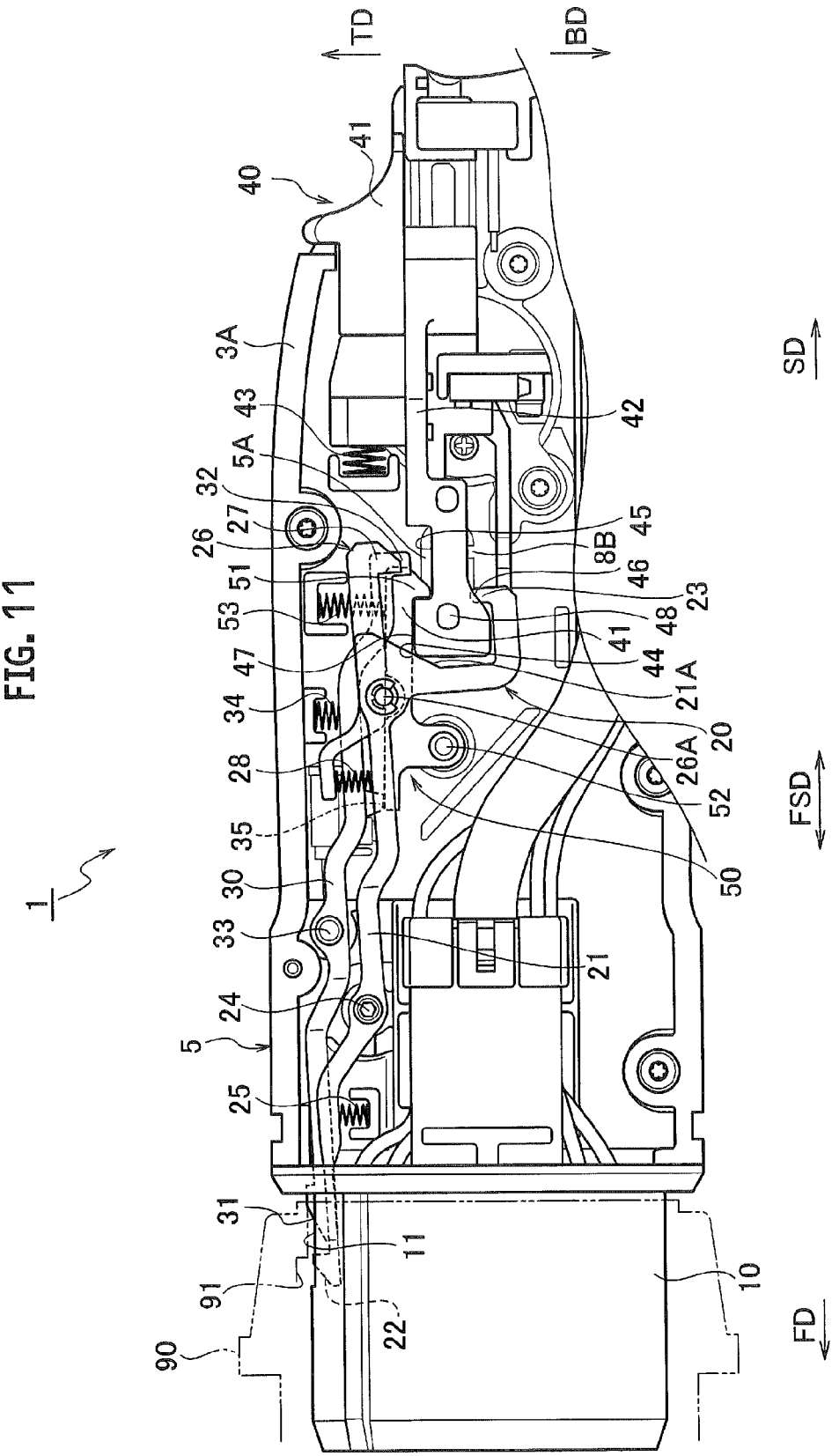
FIG. 11 is a view for explaining the operation (during removal operation) of the charging connector according to the embodiment.

As illustrated in FIG. 11, once the charge of the storage battery (not illustrated) mounted on the vehicle is completed and when the charging connector 1 is removed from the vehicle-side inlet 90, the release switch 41 of the release lever 40 is pushed (pressed in the fitting direction FD). The slide projections 48 of the release lever 40 then slide in the fitting direction FD (in particular, from the rear groove 8B side to the front groove 8A side) in the slide grooves 6 on the inner surface of the case body 5.

In the end position of the release lever 40, the tip contact portion 44 of the release body 42 comes into contact with the inclined surface 21A of the main arm 21 and the main arm 21 thus swings so that the lock claw 22 is pushed into the notch 11 of the connector fit portion 10 and the main arm 21 is located in the unlocked position.

The auxiliary lock piece 27 of the lock support arm 26 is then moved upward from the upper lock groove 45, and the lock engagement piece 23 is inserted into the lower engagement groove 46. The release lever 40 is thus held in the end position of the pushing operation and is prevented from moving toward the start position of the pushing operation.

Figure 12:
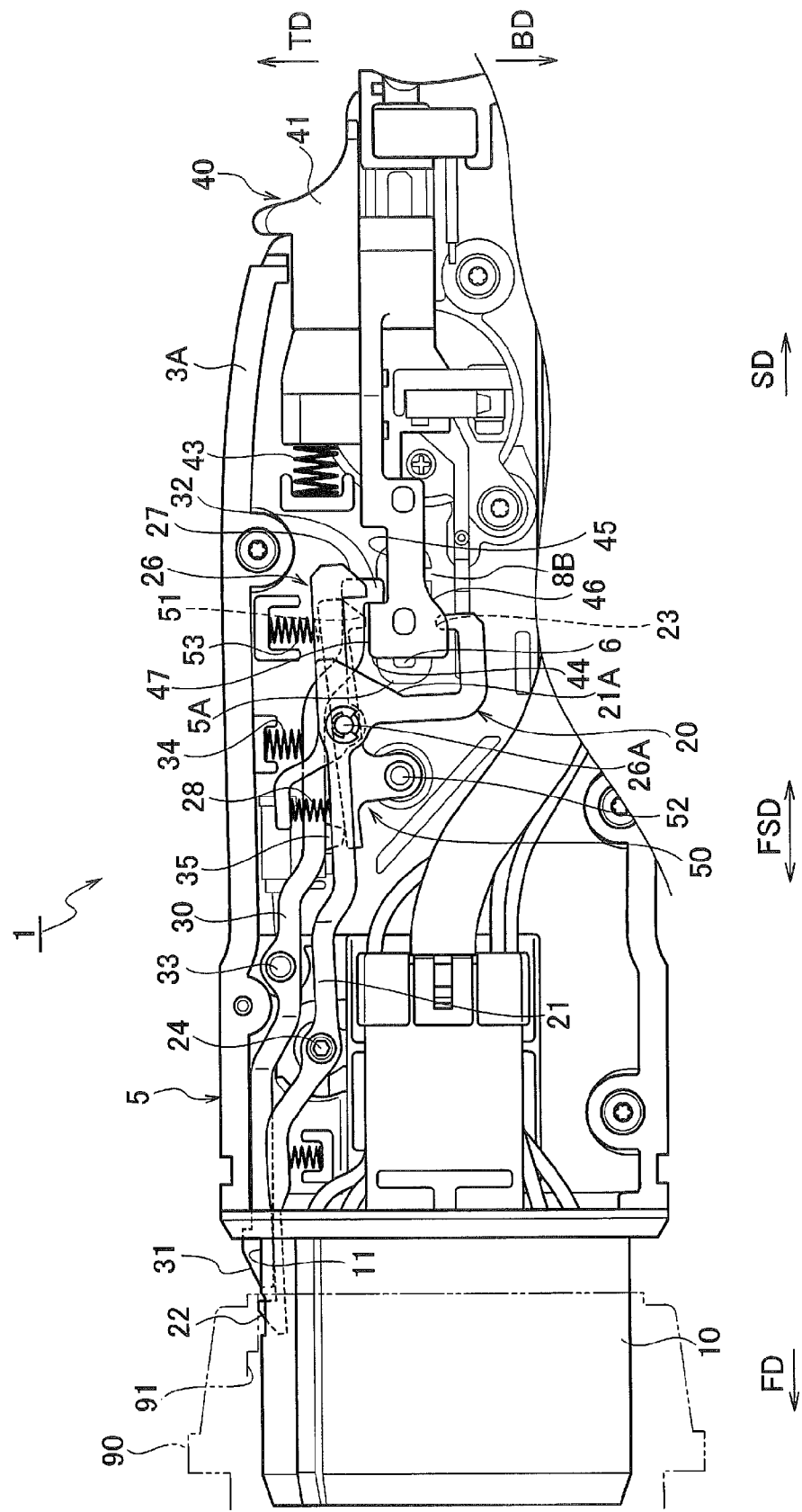
FIG. 12 is a view for explaining the operation (during removal operation) of the charging connector according to the embodiment.
Figure 13:
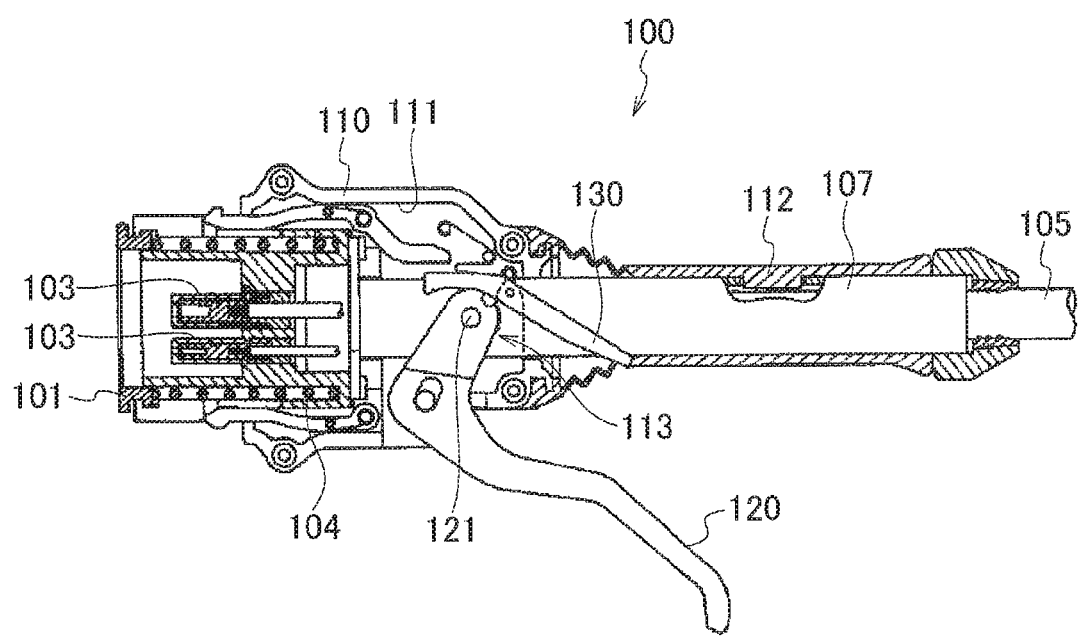
FIG. 13 is a vertical cross-sectional view illustrating the inside of a conventional charging connector.
Figure 14:
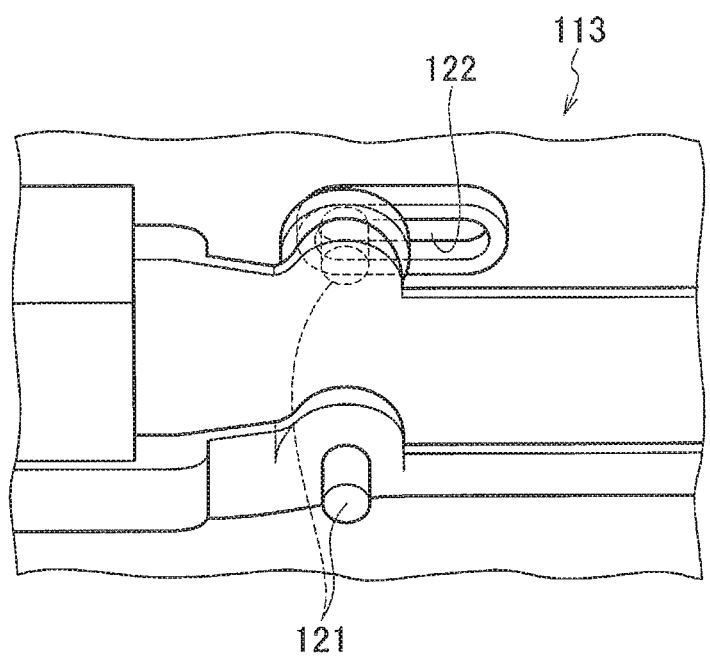
FIG. 14 is a perspective view illustrating part of the conventional charging connector.

As illustrated in FIG. 12, when the charging connector 1 is gradually removed from the vehicle-side inlet 90, the fit detection arm 30 swings and the detection claw 31 projects from the notch 11 of the connector fit portion 10. The detection lock piece 32 is then locked with the upper lock groove 45. The press projection 35 located on the rear surface of the fit detection arm 30 swings the lever holding arm 50 so that the hold lock piece 51 is separated from the upper lock groove 45.

Once the charging connector 1 is completely removed from the vehicle-side inlet 90, the charging connector 1 returns to the state before the insertion operation (refer to FIG. 7).

In the charging connector 1 according to the embodiment, the water drain grooves 8 penetrate the bottom of each of the slide grooves 6 in which the slide projections 48 of the release lever 40 are introduced. Therefore, even if water such as rainwater or water condensation passing along the inner surface of the case body 5 enters the slide grooves 6, the water inside the slide grooves 6 can be drained from the water drain grooves 8 so as to prevent the water from remaining in the slide grooves 6. Accordingly, the charging connector 1 can be fitted into and removed from the vehicle-side inlet 90 even if the water enters the slide grooves 6 since the water can be prevented from being frozen inside the slide grooves 6.

In the charging connector 1 according to the embodiment, the water drain grooves 8 include the front groove 8A and the rear groove 8B. Since the slide projections 48 slide in the slide grooves 6 from the front groove 8A side to the rear groove 8B side when the charging connector 1 is inserted into the vehicle-side inlet 90, water inside the slide grooves 6 can be drained from the rear grooves 8B even when the front grooves 8A are blocked by the slide projections 48. Similarly, since the slide projections 48 slide in the slide grooves 6 from the rear groove 8B side to the front groove 8A side when the charging connector 1 is removed from the vehicle-side inlet 90, the water inside the slide grooves 6 can be drained from the front grooves 8A even when the rear grooves 8B are blocked by the slide projections 48. Accordingly, the water inside the slide grooves 6 can be drained reliably from the water drain grooves 8 (the front grooves 8A or the rear grooves 8B) in accordance with the movement of the slide projections 48 in the slide grooves 6.

In the charging connector 1 according to the embodiment, each of the slide grooves 6 is surrounded by the projecting wall 5A, of which the lower wall surface is divided by the water drain grooves 8. Accordingly, water passing along the inner surface of the case body 5 does not easily enter each of the slide grooves 6 due to the projecting wall 5A.

Although the details of the present invention have been disclosed by way of the embodiment described above, the present invention should not be deemed to be limited to the descriptions and the drawings composing part of the disclosure. It will be apparent to those skilled in the art from the disclosure that various alternative embodiments, examples and implementations can be made.

The charging connector 1 according to the embodiment may be modified as follows. In particular, the embodiment has exemplified the case that the charging connector 1 is used for supplying electric power to the storage battery mounted on the vehicle but is not limited thereto, and the charging connector 1 may be applicable to an inlet of a storage device mounted on transportation other than the vehicle, such as a ship, a submarine, and an airplane, and an inlet of a storage device installed in a house, a building, or a factory.

Further, the embodiment has exemplified the case that the water drain grooves 8 include the front groove 8A and the rear groove 8B but is not limited thereto. For example, the water drain grooves 8 may include either the front groove 8A or the rear groove 8B. Alternatively, the slide grooves 6 may include one water drain groove 8 in the middle in the longitudinal direction thereof or include a plurality of water drain grooves 8 in the longitudinal direction.

Further, the embodiment has exemplified the case that each of the slide grooves 6 is surrounded by the projecting wall 5A of which the lower wall surface is divided by the water drain grooves 8 but is not limited thereto. For example, the slide grooves 6 and the water drain grooves 8 may be formed into recesses on the inner surface of the case body 5. Furthermore, the water drain grooves 8 are not necessarily formed on the lower wall surfaces of the projecting walls 5A but, for example, may be formed at lower edges of side wall surfaces of the projecting walls 5A.

Further, the bottoms (the lower wall surfaces) of the slide grooves 6 are formed straight in the fit-removal direction FSD but are not limited thereto. For example, the bottoms of the slide grooves 6 may be slightly inclined toward the water drain grooves 8 as long as the sliding performance of the slide projections 48 of the release lever 40 are not affected by the inclination of the bottoms of the slide grooves 6. Such an inclination contributes to smooth drain of water present inside the slide grooves 6 through the water drain grooves 8.

The present invention can, of course, include various embodiments not described in this specification. Therefore, the scope of the present invention is defined only by the appropriate features according to the claims in view of the explanations made above.

INDUSTRIAL APPLICABILITY

The present invention can provide a charging connector capable of being fitted into and removed from a vehicle-side inlet while preventing water, if entering slide grooves, from being frozen in the slide grooves.

The invention claimed is:
1. A charging connector, comprising:
   a connector case;
   a release lever provided in a slidable manner in the connector case;
   a slide projection provided in one of the connector case and the release lever;
   a slide groove provided in another one of the connector case and the release lever, in which the slide projection is inserted, the slide projection sliding in the slide groove so that the release lever is guided by the slide groove in a slidable manner; and
   a water drain groove provided on a bottom of the slide groove and extending downward to penetrate the bottom of the slide groove.
2. The charging connector according to claim 1, wherein the water drain groove includes a front groove located in the slide groove toward a vehicle-side inlet in a fitting direction and a rear groove located in the slide groove opposite to the vehicle-side inlet in a removal direction.
3. The charging connector according to claim 2, wherein the slide groove is surrounded by a projecting wall projecting on an inner surface of the connector case, and the water drain groove divides a lower wall surface of the projecting wall.

* * * * *